(12) United States Patent
Chen

(10) Patent No.: US 7,590,874 B2
(45) Date of Patent: Sep. 15, 2009

(54) OVER-HEAT PROTECTING CIRCUIT AND SYSTEM CIRCUIT BOARD THEREOF

(75) Inventor: Chun-Hsu Chen, Taichung County (TW)

(73) Assignee: Mitac International Corporation, Hsinchu County (TW)

( * ) Notice: Subject to any disclaimer, the term of this patent is extended or adjusted under 35 U.S.C. 154(b) by 494 days.

(21) Appl. No.: 11/490,158

(22) Filed: Jul. 21, 2006

(65) Prior Publication Data

US 2007/0214373 A1    Sep. 13, 2007

(30) Foreign Application Priority Data

Mar. 10, 2006    (TW) .............. 95108261 A

(51) Int. Cl.
*G06F 1/00*    (2006.01)
(52) U.S. Cl. ..................... 713/300
(58) Field of Classification Search ........ 713/300, 713/320
See application file for complete search history.

(56) References Cited

U.S. PATENT DOCUMENTS

| | | | |
|---|---|---|---|
| 6,681,336 B1 * | 1/2004 | Nakazato et al. ............ | 713/322 |
| 7,337,339 B1 * | 2/2008 | Choquette et al. ........... | 713/320 |
| 2003/0074591 A1 * | 4/2003 | McClendon et al. ......... | 713/322 |
| 2005/0154934 A1 * | 7/2005 | Kim ........................... | 713/323 |
| 2006/0053319 A1 * | 3/2006 | Balakrishnan et al. ...... | 713/300 |

* cited by examiner

*Primary Examiner*—Mark Connolly
(74) *Attorney, Agent, or Firm*—Birch, Stewart, Kolasch & Birch, LLP

(57) ABSTRACT

An over-heat protecting circuit and a system circuit board thereof are disclosed. The over-heat protecting circuit receives a voltage-detecting signal, a control signal, and an over-heat signal, and comprises a first logic circuit, a memory circuit, and a second logic circuit. The first logic circuit receives and processes the voltage-detecting signal and the over-heat signal to output a first logic signal. The memory circuit receives and processes the first logic signal and the control signal to output a latching signal. The second logic circuit receives and processes the latching signal and the control signal to output a power-control signal. Eventually, the power supplier stops outputting an operating voltage according to the power-control signal.

20 Claims, 6 Drawing Sheets

OVER-HEAT PROTECTING CIRCUIT AND SYSTEM CIRCUIT BOARD THEREOF

BACKGROUND OF THE INVENTION

1. Field of the Invention

The present invention generally relates to an over-heat protecting circuit, and in particular, to an over-heat protecting circuit and its system circuit board for protecting an over-heat CPU.

2. Description of the Prior Art

With science being developed and updated day by day, computers have being integrated into parts of our lives. Almost all the professional works rely on such tool so as to be efficient. On the other hand, the clock speeds of CPUs have being shifted from million is times per second to billion times per second. Not only the components and the circuits are more complicated, but also the heavy source codes are increasing from millions of lines to billions of lines.

A South Bridge chipset is embedded in the present motherboard, which controls most of the low-speed devices in the system, such as ISA (Industry Standard Architecture), IDE (Integrated Device Electronics), USB (Universal Serial Bus), PCI (Peripheral Component Interconnect), etc. Additionally the South Bridge chipset connects and controls the power supplier as well.

Refer to FIG. 1, which illustrates a circuit block diagram of a system circuit board in prior arts. The system circuit board 100 has a CPU 102, a South Bridge chipset 104, and a power supplier 106; wherein the South Bridge chipset 104 electrically connects the CPU 102 and the power supplier 106, and there is an over-heat protecting circuit (not shown in the figure) in the South Bridge chipset 104.

In the prior art, the CPU 102 outputs an over-heat signal to the South Bridge chipset 104 while detecting the temperature of the CPU 102 over a predetermined temperature. After the over-heat signal being processed by the over-heat protecting circuit, a turn-off signal from the CPU 102 is sent to the power supplier 106 so as to stop providing power to the system circuit board 100 and simultaneously prevent the condition of damaging the CPU 102.

FIG. 2 illustrates that the over-heat protecting circuit is embedded in the South Bridge chipset. In FIG. 2, the system circuit board 200 has a CPU 202, a super IO controller 204, a South Bridge chipset 206, a BIOS 208, and a power supplier 210.

In the prior art, the CPU 202 outputs an over-heat signal to the super IO controller 204 while detecting the temperature of the CPU 202 over a predetermined temperature. The over-heat signal from the super IO controller 204 is thus sent to the South Bridge chipset 206. After the over-heat signal being processed by the over-heat protecting circuit, a turn-off signal from the South Bridge chipset 206 is delivered to the power supplier 210 so as to stop providing power to the system circuit board 200 and simultaneously prevent the condition of damaging the CPU 202.

As mentioned above, the two embodiments in prior arts have the same point, that is, both the over-heat protecting circuit are embedded in the South Bridge chipset; the only difference between them is that the CPU 202 in FIG. 2 outputs the over-heat signal to the super IO controller 204, and then to the South Bridge chipset 206.

Please refer to FIG. 3, which illustrates another circuit block diagram of the system circuit board in prior arts. In the embodiment of FIG. 3, an over-heat protecting circuit 304 is independently installed in the system circuit board 300. Since the over-heat signal is not transmitted to the South Bridge chipset, additional circuits may be a must to turn off the power supplier 306. Traditionally such way can only turn off the power supplier 306 for milliseconds, and the system circuit board 300 may be restarted constantly, or the system is turned off after 4 seconds, hence this is not conform to the requirement of shutting down the system within 0.5 second.

The system circuit board 300 has a CPU 302, an over-heat protecting circuit 304, a power supplier 306, and a super IO controller 308; wherein the over-heat protecting circuit 304 electrically connects the CPU 302, the power supplier 306, and the super IO controller 308.

With references to FIG. 3 and FIG. 4, FIG. 4 is a practical circuit diagram of FIG. 3.

In the prior art, the over-heat protecting circuit 304 has a plurality of transistor Q2 to transistor Q5, a plurality of resistor R4 to resistor R7, a capacitor C2, an AND gate 402, and a flip-flop 404. Wherein the resistor R7 receives a memory voltage (V_SM1), the resistor R6 receives an operating voltage (VCC3), the resistors R4 and R5, the flip-flop 404, and the AND gate 402 receive a plurality of backup powers, and a base electrode of the transistor Q4 receives an over-heat signal from the CPU. While turning on the system, the over-heat signal is at logic high; otherwise, it is at logic low.

According to different power suppliers 306, the memory voltage (V_SM1) is randomly raised up slower than the operating voltage (VCC3) so as to possibly pull down the over-heat signal (THERMTRIP_L) to logic low, which is enabled by the transistor Q2, but it causes that the system is irregularly turned off due to the malfunction of the over-heat signal (THERMTRIP_L).

TABLE 1

| over-heat signal of CPU | over-heat signal/power button signal | super IO signal | power-control signal |
|---|---|---|---|
| H | H | L | L (power supplier ON) |
| L | L | L | H (power supplier OFF) |
| H | H | H | H (power supplier OFF) |
| L | L | H | H (power supplier OFF) |

With reference to Table 1, which shows the plurality of states of logic potential of the over-heat signal of the CPU (CPU_THERMTRIP_L), the over-heat signal (THERMTRIP_L)/the power button signal (PWRBTN_L), the super IO signal (SIO_ONCTL_L), and the power-control signal (PSON_L). Wherein H represents the state of high logic potential and L represents the state of low logic potential.

After the system is normally turned on and operated for a while, continuously the CPU 302 detects a temperature thereof over a predetermined temperature, and the over-heat signal of the CPU (CPU_THERMTRIP_L) may be pull down to logic low. The over-heat signal of the CPU (CPU_THERMTRIP_L) is thus divided into two signals, the over-heat signal (THERMTRIP_L) and the power button signal (PWRBTN_L), and transmitted along two paths after the logic levels of the transistors Q2 and Q5 are transformed.

Referring to the first path, the AND gate 402 receives the over-heat signal (THERMTRIP_L) and the super IO signal (SIO_ONCTL_L) inverted by the inverter 404. Subsequently the AND gate 402 generates an invert signal to turn off the power supplier 306, meanwhile the power-control signal (SPON_L) is at logic high.

On the other hand, while the super IO controller 308 detects the condition of power fail, the super IO signal (SIO_ONCTL_L) handled by the super IO controller may be raised to logic high after the BIOS processing around 0.5 to 20 seconds so as to distinctly turn off the power supplier 306.

While the power-control signal (PSON_L) is converted to logic high, as shown in Table 1, the over-heat signal (THERMTRIP_L) is immediately converted to logic high due to the conditions of power fail and capacitor residue voltage (the transistor Q2 is disabled). Alternatively, the super IO signal (SIO _NCTL_L) is not converted to logic high by the super IO controller 308 yet, the power-control signal (PSON_L) is then converted to the state of low logic potential in order to restart the power supplier 306. Hence the purpose of turning off may not be achieved.

The second path is for a forced turn-off operation according to the power button signal (PWRBTN_L). As shown in the prior arts, the forced turn-off operation of the system may need 4 seconds, which does not meet the requirement of shutting down the system within 0.5 second.

SUMMARY OF THE INVENTION

The primary objective of the present invention is to provide an over-heat protecting circuit for turning off a power within a predetermined time interval and avoiding the over-heat temperature causing the damage of a CPU.

The present invention provides the over-heat protecting circuit, which receives a voltage-detecting signal, a control signal, and an over-heat signal and has a first logic circuit, a memory circuit, and a second logic circuit; wherein the first logic circuit receives and processes the voltage-detecting signal and the over-heat signal to output a first logic signal; the memory circuit electrically connects the first logic circuit for receiving and processing the first logic signal and the control signal to output a latching signal; and the second logic circuit electrically connects the memory circuit for receiving and processing the latching signal and the control signal to output a power-control signal; wherein the power supplier stops outputting an operating voltage according to the power-control signal.

According to the preferred embodiment of the present invention, the over-heat protecting circuit electrically connects the CPU, and the CPU may output an over-heat signal while detecting a temperature over a predetermined temperature.

The present invention provides another over-heat protecting circuit, which receives a voltage-detecting signal, a control signal, and an over-heat signal and has a first logic circuit, an inverter, a memory circuit, and a second logic circuit; wherein the first logic circuit receives and processes the voltage-detecting signal and the over-heat signal to output a first logic signal; the inverter electrically connects the memory circuit and the second logic circuit for receiving the control signal and outputting an inverted control signal to the memory circuit and the second logic circuit; the memory circuit electrically connects the first logic circuit for receiving and processing the first logic signal and the inverted control signal to output a latching signal; and the second logic circuit electrically connects the memory circuit for receiving and processing the latching signal and the inverted control signal to output a power-control signal; wherein the power supplier stops outputting an operating voltage according to the power-control signal.

The present invention further provides a system circuit board has a CPU, an IO controller, an over-heat protecting circuit, and a power supplier; wherein the CPU outputs an over-heat signal while detecting a predetermined temperature; the IO controller electrically connects the CPU and outputs a control signal according to the over-heat signal; the over-heat protecting circuit electrically connects the CPU and the IO controller for receiving and processing a voltage-detecting signal, the over-heat signal, and the control signal to output a power-control signal; wherein the power supplier stops outputting an operating voltage according to the power-control signal.

Other and further features, advantages and benefits of the invention will become apparent in the following description taken in conjunction with the following drawings. It is to be understood that the foregoing general description and following detailed description are exemplary and explanatory but are not to be restrictive of the invention. The accompanying drawings are incorporated in and constitute a part of this application and, together with the description, serve to explain the principles of the invention in general terms. Like numerals refer to like parts throughout the disclosure.

BRIEF DESCRIPTION OF THE DRAWINGS

The objects, spirits and advantages of the preferred embodiments of the present invention will be readily understood by the accompanying drawings and detailed descriptions, wherein.

DETAILED DESCRIPTION OF THE INVENTION

Figure 1:
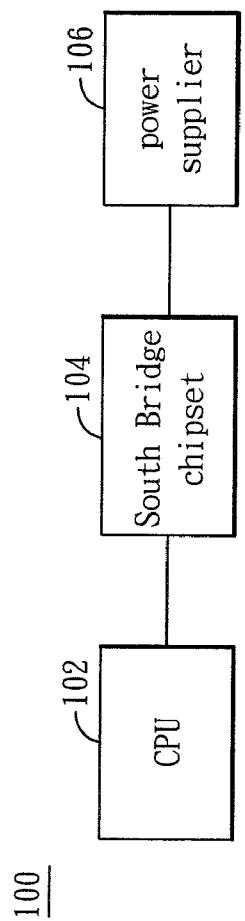
FIG. 1 illustrating a circuit block diagram of a system circuit board in prior arts.
Figure 2:
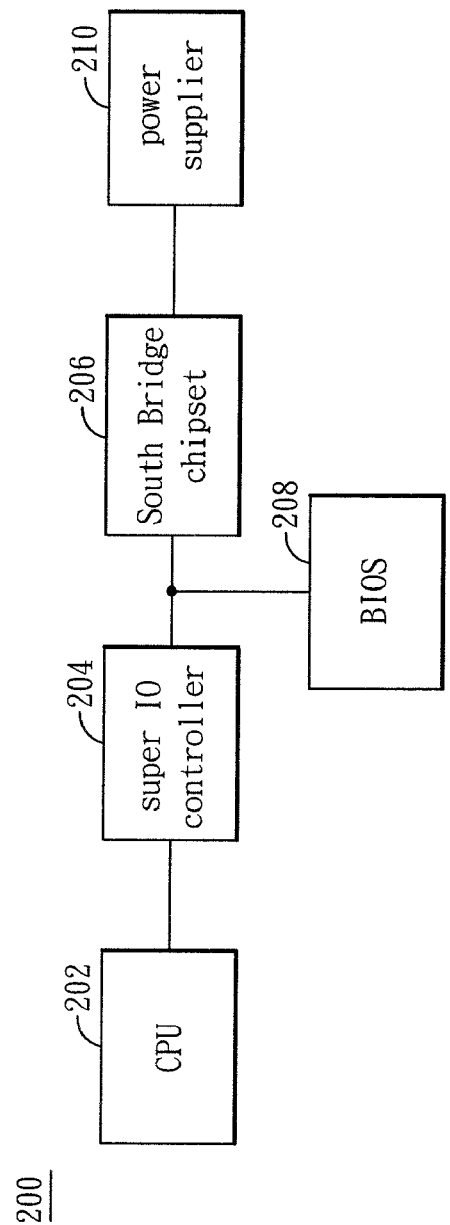
FIG. 2 illustrating another circuit block diagram of the system circuit board in prior arts.
Figure 3:
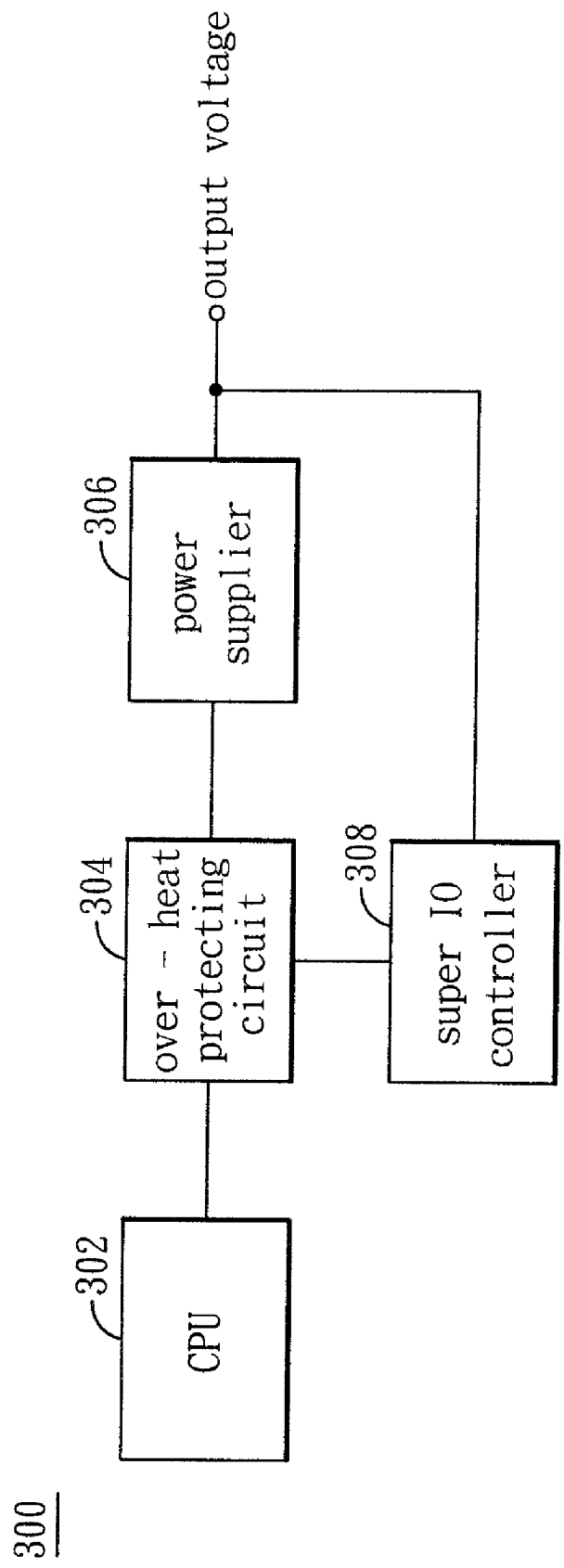
FIG. 3 illustrating another circuit block diagram of the system circuit board in prior arts.
Figure 4:
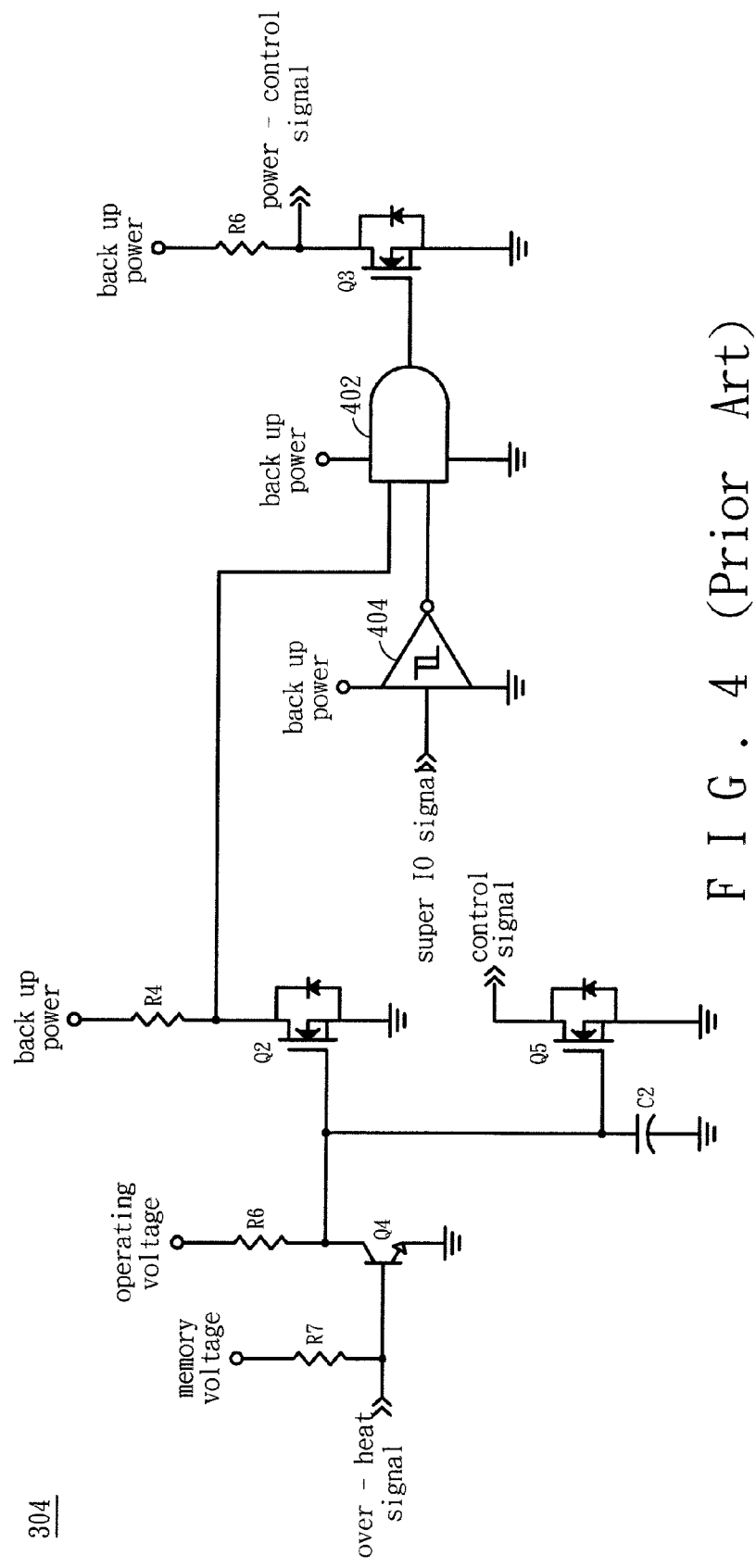
FIG. 4 illustrating a practical circuit diagram of an over-heat protecting circuit of FIG. 3.
Figure 5:
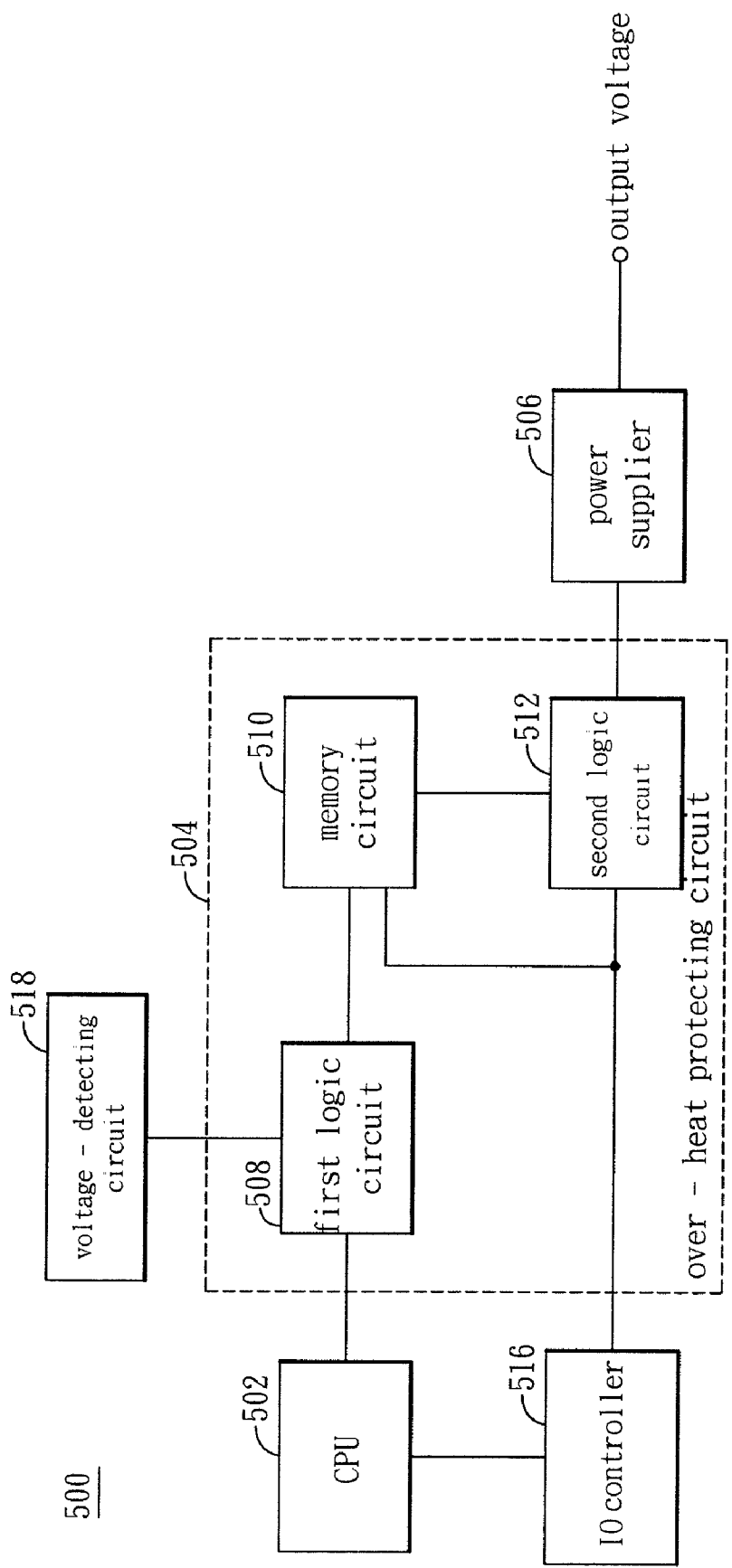
FIG. 5 illustrating a circuit diagram of a preferred embodiment of a system circuit board of the present invention.

FIG. 5 is a circuit diagram of a preferred embodiment of a system circuit board of the present invention. As shown in FIG. 5, the system circuit board 500 has a CPU 502, an over-heat protecting circuit 504, a power supplier 506, an IO controller 516, and a voltage-detecting circuit 518; wherein the system circuit board 500 may be a mother board and the IO controller 516 is a super IO controller but not subject to.

For the preferred embodiment, the CPU 502 outputs an over-heat signal while detecting a temperature over a predetermined temperature. The IO controller 516 electrically connects the CPU 502 and controls a control signal according to the over-heat signal. A person skilled in the art can easily understand that the IO controller 516 may be as a super IO controller but not subject to. The super IO controller is a floppy disk controller in practice to control a mouse and a keyboard.

The over-heat protecting circuit 504 electrically connects the CPU 502, the IO controller 516, the voltage-detecting 518, and the power supplier 506, and receives a voltage-detecting signal from the voltage-detecting circuit 518, the over-heat signal from the CPU 502, and the control signal from the IO controller 516. The over-heat protecting circuit 504 has a first logic circuit 508, a memory circuit 510, and a second logic circuit 512.

The first logic circuit 508 receives the voltage-detecting signal and the over-heat signal for processing and thus outputs a first logic signal; the memory circuit 510 electrically connects the first logic circuit 508 and receives the first logic signal and the control signal for processing and consequently outputs a latching signal; and the second logic circuit 512 electrically connects the memory circuit 510 and receives the latching signal and the control signal for processing and continuously outputs a power-control signal.

For the preferred embodiment, the memory circuit 510 is a circuit able to memorize or latch the first logic signal and control the state of the signal.

The power supplier 506 electrically connects the second logic circuit 512 and stops outputting an operating voltage according to the power-control signal.

The voltage-detecting circuit 518 detects an output voltage from the power supplier for receiving and outputting the voltage-detecting signal.

Figure 6:
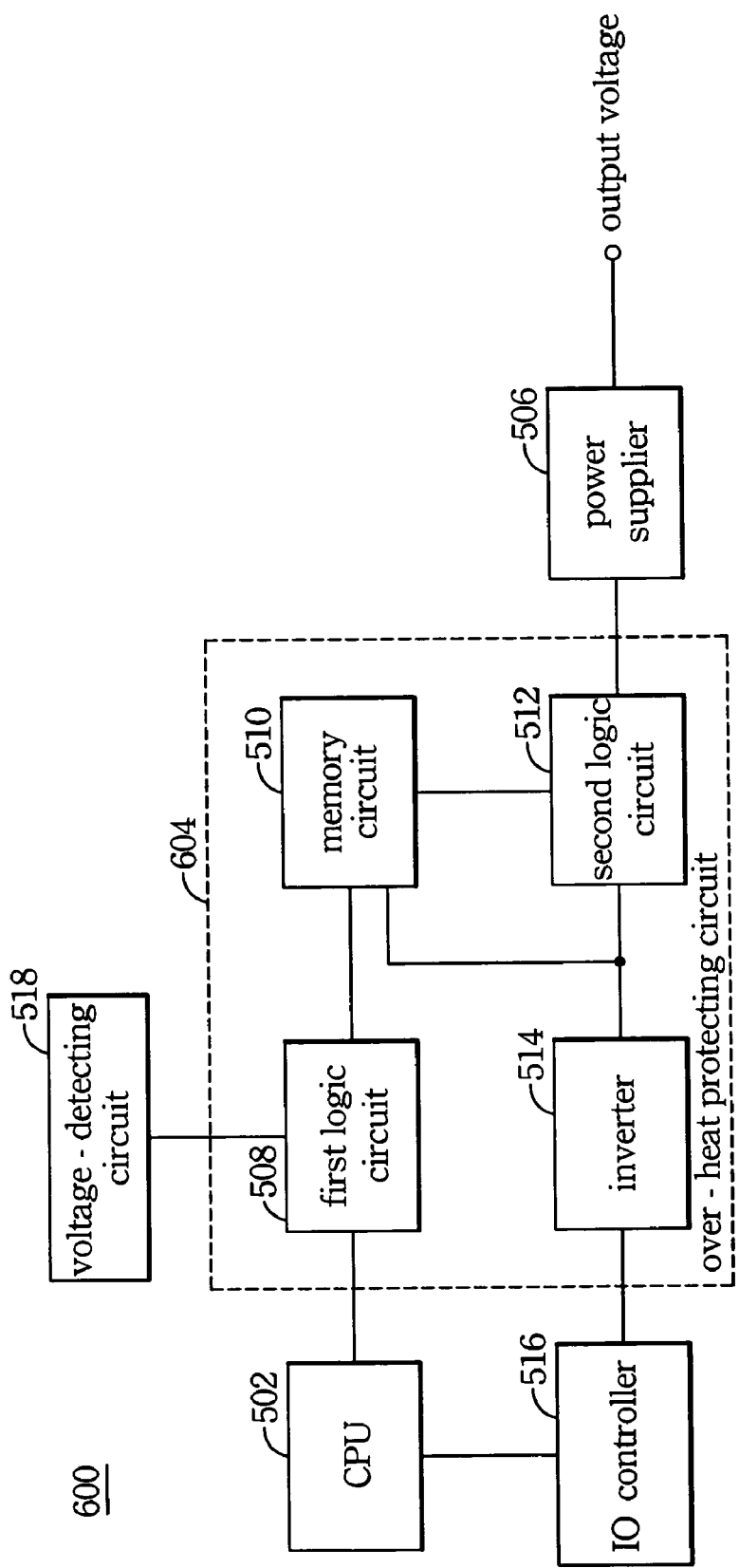
FIG. 6 illustrating a circuit diagram of another preferred embodiment of the system circuit board of the present invention.

FIG. 6 is a circuit diagram of another preferred embodiment of the system circuit board of the present invention. The difference between FIG. 5 and FIG. 6 is that an inverter 514 is added to an over-heat protecting circuit 604, while FIG. 5 is short of the inverter 514. The inverter 514 electrically connects the IO controller 516 and the second logic circuit 512, receives the control signal and outputs an inverted control signal afterwards.

The following describes the difference between the over-heat protecting circuits 604 in FIG. 5 and FIG. 6. The memory circuit 510 receives the first logic signal and the inverted control signal for processing and consequently outputs a latching signal. The second logic circuit receives the latching signal and the inverted control signal for processing and continuously outputs a power-control signal.

Figure 7:
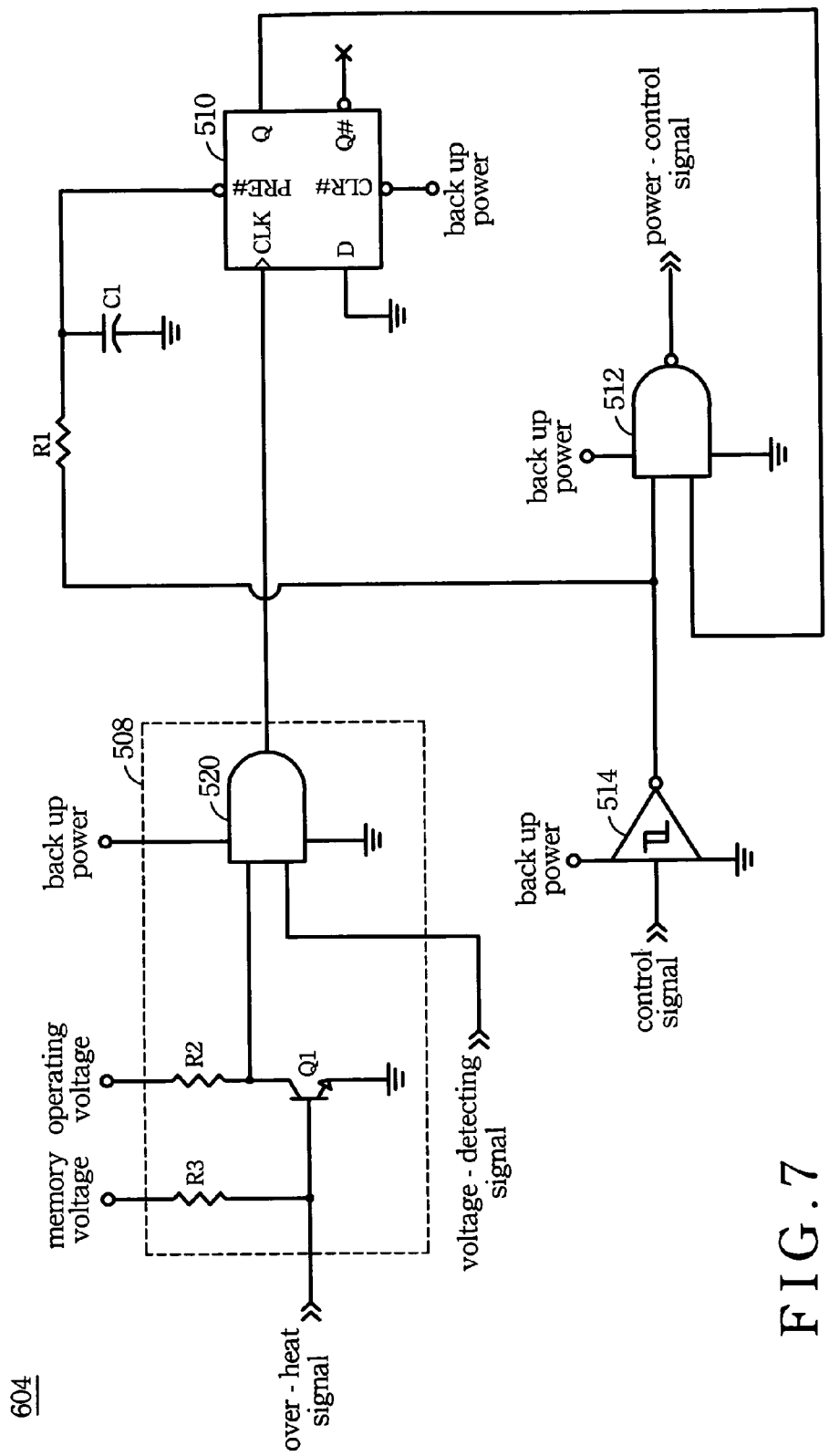
FIG. 7 illustrating a practical circuit diagram of the over-heat protecting circuit of FIG. 6.

FIG. 7 illustrates a practical circuit diagram of the over-heat protecting circuit of FIG. 6. In FIG. 7, the over-heat protecting circuit 604 has the first logic circuit 508, the memory circuit 510, the second logic circuit 512, and further that of a resistor R1 and a capacitor C1. A person skilled in the art can easily understand that the memory circuit 510 may be as a flip-flop, in particular, a D-type positive-edge-triggered flip-flop, but is not subject to.

In the preferred embodiment, please refer to FIG. 6 and FIG. 7 simultaneously. The first logic circuit 508 has an AND gate 520, a transistor Q1, a resistor R2, and a resistor R3; wherein the transistor Q1 is activated according to the over-heat signal form the CPU 502, the over-heat signal may be the signal of CPU_THERMTRIP_L. The AND gate 520 receives the over-heat signal and the voltage-detecting signal, and outputs the first logic signal to the memory circuit 510 after processing the over-heat signal and the voltage-detecting signal.

Take a D-type flip-flop as an example of the memory circuit 510 in FIG. 7. An input port of the memory circuit 510 has a clock (CLK) port, a D port, a reset (PER#) port, and a clear (CLR#) port, wherein an output port of the memory circuit 510 has a Q port and a Q# port, the clock (CLK) port connects an output port of the AND gate 520, the D port connects the earth, the reset (PER#) port connects an output port of the inverter 514, the Q port connects an output port of the AND gate 512, the Q# port is the connection of floating.

TABLE 2

| | Input port | | | | Output port | |
|---|---|---|---|---|---|---|
| | PRE# | CLR# | CK | D | Q | Q# |
| 1 | L | H | X | X | H | L |
| 2 | H | H | L > H | L | L | H |
| 3 | H | H | L | X | Q | Q# |

Table 2 is a Table with practical values of the memory circuit 510.

For the preferred embodiment, the inverted over-heat signal (CPU_THERMTRIP_L) and the voltage-detecting signal are combined by means of the AND gate 512 so as to reach logic high for avoiding abnormally turning off the system. For the voltage-detecting signal, a power supplier (PWROK) is raised up to logic high after regularly turning on.

After that, the memory circuit 510 controls the subsequent procedures of the over-heat signal (CPU_THERMTRIP_L). While the power supplier 506 connects the system circuit board 600, the output port Q of the memory circuit 510 is set at logic high, as shown in the row 1 of Table 2. Sequentially the output port Q is kept at logic high by means of the memory circuit 510 according to the row 3 of Table 2 in order to complete the initial output set of the memory circuit 510.

After the system is normally turned on and operated for a while, if the CPU 502 detects a temperature thereof that reaches a predetermined temperature, the over-heat signal of the CPU 502 (CPU_THERMTRIP_L) will be pull down to logic low. The over-heat signal (THERMTRIP) generates a signal from logic low to logic high afterwards, as shown in the row 2 of Table 2. Such signal sets the output port Q of the memory circuit 510 at logic low, and combines with a NAND gate for the inverted signal of the control signal (SIO_ONCTL_L) so as to generate and output the power-control signal to the power supplier 506 and simultaneously turn off the power supplier 506.

The power-control signal (PSON_L) keeps at the stage of low potential. Otherwise it is reset at the stage of high potential while the control signal (SIO_ONCTL_L) is set at the stage of high potential by means of the IO controller. In the meantime, the system circuit board 500 keeps the state of turning off even if the power button is pressed. The state is not changed until the control signal (SIO_ONCTL_L) is converted to logic low by means of the IO controller 516.

For the preferred embodiment of the present invention, the IO controller 516 further has an over-heat signal processing unit (not shown) for processing the received over-heat signal and outputting the control signal.

The resistor R3 receives the memory voltage. The resistor R2 is capable of receiving the operating voltage. The AND gate 520, an input port (CLR#) of the memory circuit 510, the AND gate 512, and the inverter 514 receive the plurality of backup powers.

As a conclusion, the over-heat protecting circuit and the system circuit board of the present invention are capable of turning off a power within a predetermined time interval and avoiding the over-heat temperature causing the damage of a CPU.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. An over-heat protecting circuit electrically connecting a power supplier and receiving a voltage-detecting signal, a control signal, and an over-heat signal, comprising:
   a first logic circuit receiving and processing the voltage-detecting signal and the over-heat signal to output a first logic signal;
   a memory circuit electrically connecting the first logic circuit for receiving and processing the first logic signal and the control signal to output a latching signal; and
   a second logic circuit electrically connecting the memory circuit for receiving and processing the latching signal and the control signal to output a power-control signal;
   wherein the power supplier stops outputting an operating voltage according to the power-control signal.

2. The over-heat protecting circuit according to claim 1 electrically connecting a CPU, which outputs the over-heat signal while detecting a predetermined temperature.

3. The over-heat protecting circuit according to claim 1 electrically connecting an IO controller for receiving the control signal.

4. The over-heat protecting circuit according to claim 1 electrically connecting a voltage-detecting circuit, which detects an output voltage from the power supplier for receiving and outputting the voltage-detecting signal.

5. The over-heat protecting circuit according to claim 1, wherein the memory circuit is erased according to the control signal.

6. The over-heat protecting circuit according to claim 1, wherein the first logic circuit comprises at least one AND gate, the AND gate receives the voltage-detecting signal and the over-heat signal for outputting the first logic signal.

7. The over-heat protecting circuit according to claim 1, wherein the second logic circuit comprises an AND gate, the AND gate receives the latching signal and the control signal for outputting the power-control signal.

8. The over-heat protecting circuit according to claim 1, wherein the memory circuit comprises a flip-flop, which receives the first logic signal and the control signal for outputting the latching signal.

9. The over-heat protecting circuit according to claim 1 further comprising:
   an inverter electrically connecting the memory circuit and the second logic circuit for receiving the control signal and outputting an inverted control signal to the memory circuit and the second logic circuit.

10. The over-heat protecting circuit according to claim 9, wherein the memory circuit receives and processes the first logic signal and the inverted control signal to output the latching signal, and the second logic circuit receives and processes the latching signal and the inverted control signal to output the power-control signal.

11. A system circuit board, comprising:
    a CPU outputting an over-heat signal while detecting a predetermined temperature;
    an IO controller electrically connecting the CPU and outputting a control signal according to the over-heat signal;
    an over-heat protecting circuit electrically connecting the CPU and the IO controller and receiving a voltage-detecting signal, the over-heat signal, and the control signal, the over-heat protecting circuit comprising:
    a first logic circuit receiving and processing the voltage-detecting signal to output a first logic signal;
    an inverter receiving and inverting the control signal to output an inverted control signal;
    a memory circuit electrically connecting the first logic circuit and the inverter for receiving and processing the first logic signal and the inverted control signal to output a latching signal;
    a second logic circuit electrically connecting the memory circuit and the inverter for receiving and processing the latching signal and the inverted control signal to output a power-control signal; and
    a power supplier electrically connecting the second logic circuit and stopping outputting an operating voltage according to the power-control signal.

12. The system circuit board according to claim 11 further comprising a voltage-detecting circuit that detects an output voltage from the power supplier for outputting the voltage-detecting signal.

13. The system circuit board according to claim 11, wherein the memory circuit is erased according to the control signal.

14. The system circuit board according to claim 11, wherein the first logic circuit comprises at least one AND gate which receives the voltage-detecting signal and the over-heat signal for outputting the first logic signal.

15. The system circuit board according to claim 11, wherein the second logic circuit comprises an AND gate that receives the latching signal and the control signal for outputting the power-control signal.

16. The system circuit board according to claim 11, wherein the memory circuit comprises a flip-flop that receives the first logic signal and the control signal for outputting the latching signal.

17. The system circuit board according to claim 11, wherein the IO controller comprises an over-heat signal processing unit for processing the received over-heat signal and outputting the control signal.

18. A system circuit board, comprising:
    a CPU outputting an over-heat signal while detecting a predetermined temperature;
    an IO controller electrically connecting the CPU and outputting a control signal according to the over-heat signal;
    an over-heat protecting circuit electrically connecting the CPU and the IO controller and receiving a voltage-detecting signal, the over-heat signal, and the control signal, the over-heat protecting circuit comprising:
    a first logic circuit receiving and processing the voltage-detecting signal and the over-heat signal to output a first logic signal;
    a memory circuit electrically connecting the first logic circuit for receiving and processing the first logic signal and the control signal to output a latching signal;
    a second logic circuit electrically connecting the memory circuit for receiving and processing the latching signal and the control signal to output a power-control signal; and
    a power supplier electrically connecting the second logic circuit and stopping outputting an operating voltage according to the power-control signal.

19. The system circuit board according to claim 18 further comprising a voltage-detecting circuit that detects an output voltage from the power supplier for receiving and outputting the voltage-detecting signal.

20. The system circuit board according to claim 18, wherein the IO controller comprises an over-heat signal processing unit for processing the received over-heat signal and outputting the control signal.

* * * * *